(12) United States Patent
Lowe et al.

(10) Patent No.: US 12,354,230 B2
(45) Date of Patent: Jul. 8, 2025

(54) SYSTEM AND METHOD WITH SPHERICAL AUTOENCODER FOR OBJECT DISCOVERY

(71) Applicant: Robert Bosch GmbH, Stuttgart (DE)

(72) Inventors: Sindy Lowe, Amsterdam (NL); Maja Rudolph, Madison, WI (US); Max Welling, Belgium (NL); Filipe Condessa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 476 days.

(21) Appl. No.: 17/957,156

(22) Filed: Sep. 30, 2022

(65) Prior Publication Data

US 2024/0127393 A1    Apr. 18, 2024

(51) Int. Cl.
*G06T 3/00* (2024.01)
*G06V 10/75* (2022.01)
*G06V 10/82* (2022.01)

(52) U.S. Cl.
CPC .............. *G06T 3/00* (2013.01); *G06V 10/751* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 6,453,729 B1* | 9/2002 | Muto | ..................... | G01N 29/46 73/104 |
| 2010/0155609 A1* | 6/2010 | Silva | .................... | G02B 5/1876 250/363.06 |
| 2011/0044524 A1* | 2/2011 | Wang | ................. | G01R 33/5601 382/131 |
| 2023/0118864 A1* | 4/2023 | Zhang | .................... | G06V 10/26 382/103 |

OTHER PUBLICATIONS

Ates et al., "Spherical Coding Algorithm for Wavelet Image Compression," IEEE Transactions On Image Processing, vol. 18, No. 5, May 2009 (Year: 2009).*
Lowe et al., Complex-Valued Autoencoders for Object Discovery, arXiv:2204.02075v1 [cs.LG], Apr. 5, 2022, pp. 1-20.

* cited by examiner

*Primary Examiner* — Soo Shin
(74) *Attorney, Agent, or Firm* — Kathy Takeguchi; Maginot, Moore & Beck LLP (57) ABSTRACT

A computer-implemented system and method relate to object discovery. The system and method include receiving a source image and generating input data by associating each pixel of the source image with predetermined phase values. An encoder encodes the input data to generate latent representation data in spherical coordinates. A decoder decodes the latent representation data to generate spherical reconstruction data of the source image. The spherical reconstruction data includes a radial component and a plurality of phase components. A reconstructed image is generated based at least on the radial component. The reconstructed image is a reconstruction of the source image.

20 Claims, 5 Drawing Sheets

SYSTEM AND METHOD WITH SPHERICAL AUTOENCODER FOR OBJECT DISCOVERY

TECHNICAL FIELD

This disclosure relates generally to digital image processing, and more specifically to machine learning systems associated with object-centric representations for object discovery.

BACKGROUND

Currently, most machine learning work on object discovery focuses on slot-based approaches, which separate the latent representations of individual objects. However, these slot-based systems tend to require involved architectures with iterative procedures and intricate training schemes to achieve a good separation of object features into slots. In addition, there is a complex autoencoder, which learns object-centric representations using complex valued activations. However, the complex autoencoder is restricted in the number of objects that it can represent.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to object discovery. The method includes receiving a source image. The method includes generating input data for an encoder by associating each pixel of the source image with predetermined phase values. The method includes encoding, via the encoder, the input data to generate latent representation data in spherical coordinates. The method includes decoding, via a decoder, the latent representation data to generate spherical reconstruction data of the source image. The spherical reconstruction data includes a radial component and a plurality of phase components. The method includes generating a reconstructed image based at least on the radial component. The reconstructed image is a reconstruction of the source image.

According to at least one aspect, a system includes a processor and a memory. The memory is in data communication with the processor. The memory has computer readable data including instructions stored thereon that, when executed by the processor, cause the processor to perform a method. The method includes receiving a source image. The method includes generating input data for an encoder by associating each pixel of the source image with predetermined phase values. The method includes encoding, via the encoder, the input data to generate latent representation data in spherical coordinates. The method includes decoding, via a decoder, the latent representation data to generate spherical reconstruction data of the source image. The spherical reconstruction data includes a radial component and a plurality of phase components. The method includes generating a reconstructed image based at least on the radial component. The reconstructed image is a reconstruction of the source image.

According to at least one aspect, a non-transitory computer readable medium has computer readable data including instructions stored thereon that, when executed by a processor, cause the processor to perform a method. The method includes receiving a source image. The method includes generating input data for an encoder by associating each pixel of the source image with predetermined phase values. The method includes encoding, via the encoder, the input data to generate latent representation data in spherical coordinates. The method includes decoding, via a decoder, the latent representation data to generate spherical reconstruction data of the source image. The spherical reconstruction data includes a radial component and a plurality of phase components. The method includes generating a reconstructed image based at least on the radial component. The reconstructed image is a reconstruction of the source image.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
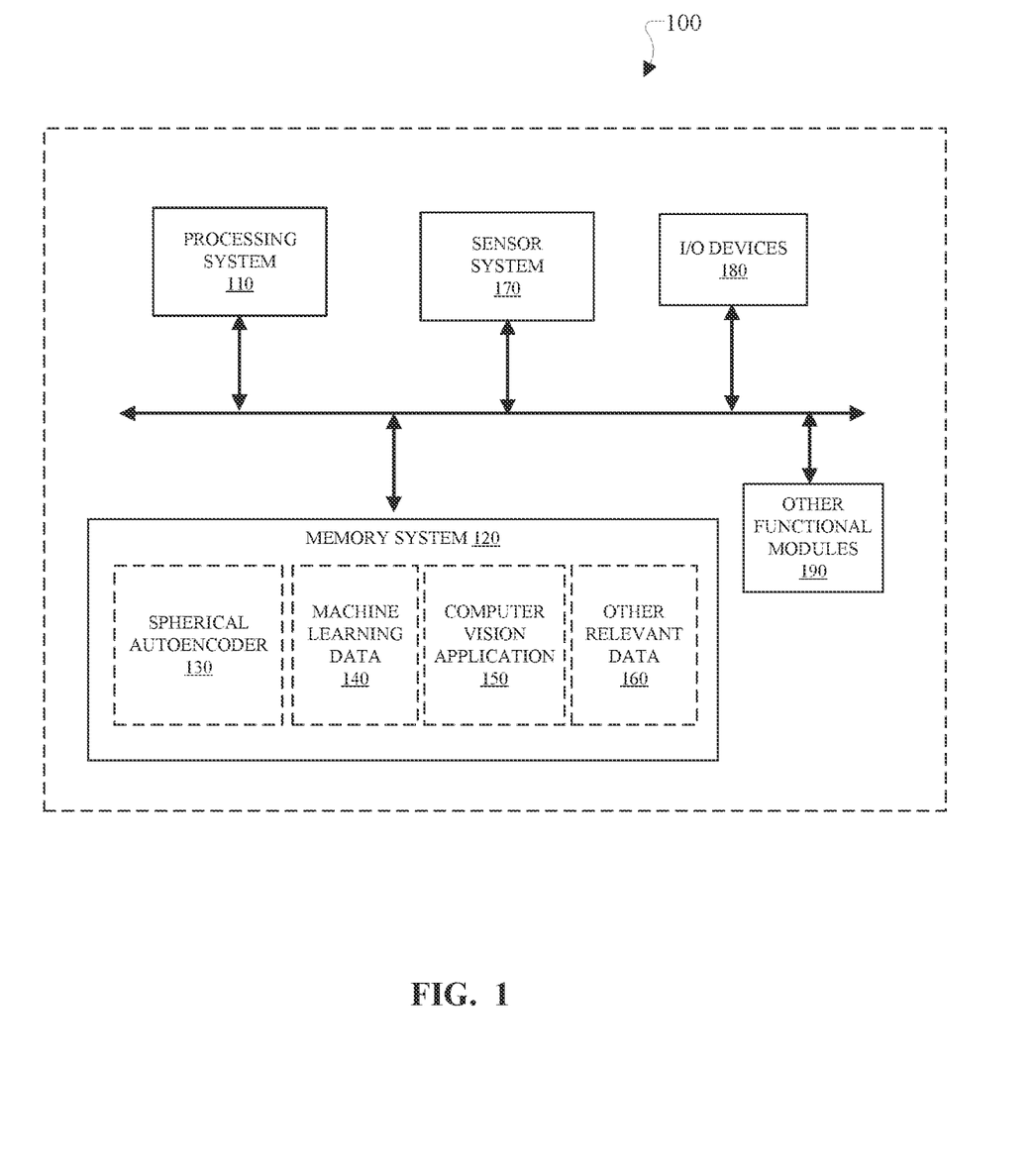
FIG. 1 is a diagram of an example of a system that includes a spherical autoencoder for object discovery according to an example embodiment of this disclosure.

FIG. 1 illustrates a system 100 that performs digital image processing. The system 100 includes a spherical autoencoder 130. The spherical autoencoder 130 is configured to learn object-centric representations via activations using spherical coordinates. In this regard, the system 100 is configured to receive an input image (e.g., source image 202) and generate, via the spherical autoencoder 130, an output image (e.g., reconstructed image 228). The output image is a reconstructed version of the input image. In addition, the system 100 is configured to generate object segmentation masks 230 for objects in the input image (e.g., source image 202).

The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 includes random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least the spherical autoencoder 130 and machine learning data 140, which are stored thereon. The memory system 120 may also include a computer vision application 150, and other relevant data 160, which may also be stored thereon. The spherical autoencoder 130 includes computer readable data with instructions, which, when executed by the processing system 110, is configured to at least train (or train and employ) the spherical autoencoding network 200. The spherical autoencoder 130 is also configured to be deployed and employed in another system (e.g., FIG. 3). The computer readable data can include instructions, code, routines, various related data, any software technology, or any number and combination thereof.

Figure 2:
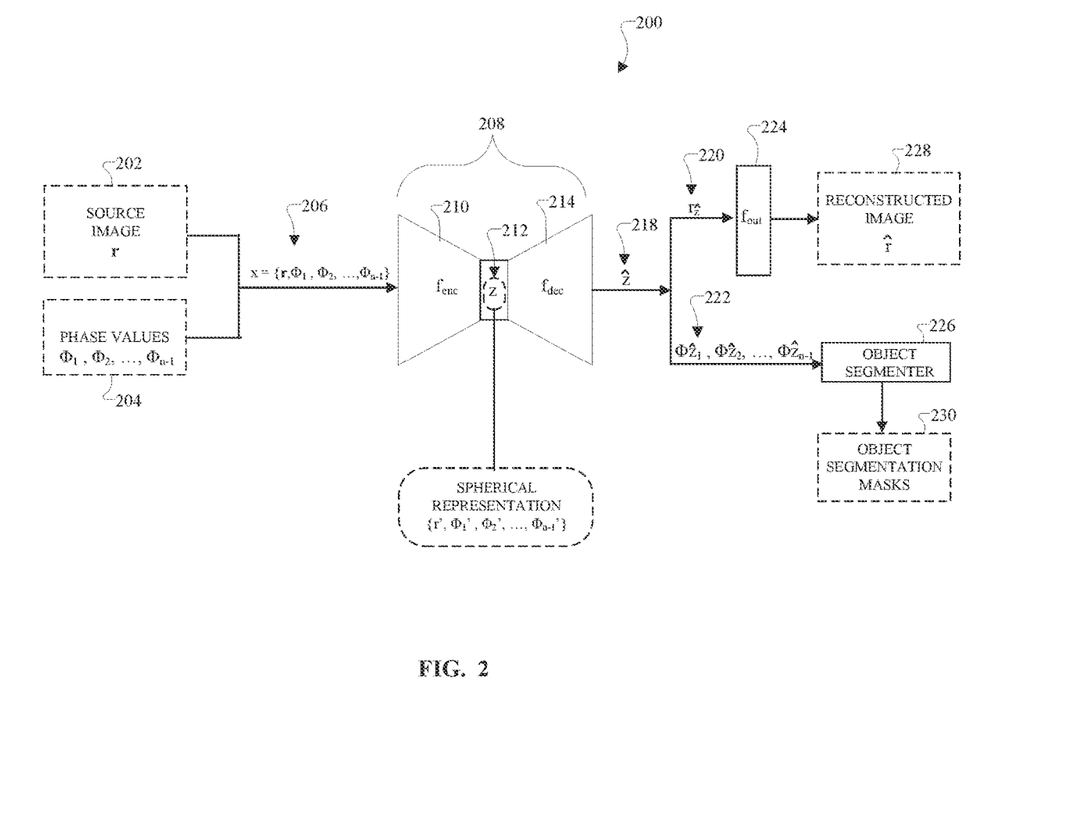
FIG. 2 is a diagram of an example of a spherical autoencoding network according to an example embodiment of this disclosure.

The spherical autoencoder 130 includes a spherical autoencoding network 200 (FIG. 2). The spherical autoencoding network 200 includes at least one artificial neural network model and/or any suitable machine learning model, which is configured to perform the spherical autoencoding process as discussed herein. For example, the spherical autoencoding network 200 includes a convolutional autoencoder 208, and a convolutional layer 224. The convolutional autoencoder 208 comprises a convolutional encoder 210 (with an encoding function of fine) and a convolutional decoder 214 (with a decoding function of flee). In addition, the spherical autoencoding network 200 is configured to include an object segmenter 226. The spherical autoencoding network 200 is configured to receive an input image, such as source image 202, as input. The source image 202 is a digital image, which is obtained directly or indirectly from one or more sensors of the sensor system 170. Upon receiving the source image 202, the spherical autoencoding network 200 is configured to generate spherical reconstruction data 218. With the spherical reconstruction data 218, the spherical autoencoding network 200 is configured to generate a reconstructed image 228, object segmentation masks 230, or both a reconstructed image 228 and object segmentation masks 230.

In addition, the machine learning data 140 includes any data relating to the training, deployment, or employment of the spherical autoencoder 130. For example, the machine learning data 140 includes training data, various images, various loss data, object segmentation mask data, any data related to the spherical autoencoder 130, or any number and combination thereof. Also, the computer vision application 150 is configured to apply the output (e.g., object segmentation masks 230 and/or reconstructed image 228) of the spherical autoencoder 130 to computer vision technology. The computer vision application 150 is configured to perform object classification, object recognition, object tracking, any computer vision task, or any number and combination thereof based on the object segmentation masks 230. In addition, the computer vision application 150 may compare the reconstructed image 228 to the source image 202 to determine the quality of the output that is being generated by the spherical autoencoding network 200. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor (e.g., microphone), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate digital images based on the sensor data. In this regard, the processing system 110 is configured to obtain the sensor data as digital images directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. digital images) in connection with the spherical autoencoder 130, the machine learning data 140, the computer vision application 150, the other relevant data 160, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology (e.g, wired communication technology, wireless communication technology, or a combination thereof) that enables components of the system 100 to communicate with each other as described herein.

As aforementioned, the system 100 is operable to perform digital image processing, as described herein, for object discovery via activations using spherical coordinates. The system 100 is configured to use spherical coordinates to represent vectors. In this regard, during this process as discussed in FIG. 2, the system 100 is configured to convert spherical coordinate data into cartesian coordinate data in accordance with at least equation 1, equation 2, and equation 3.

$$x_1 = r \cdot \cos(\varphi_1) \quad [1]$$

$$x_k = r \cdot \Pi_{i=1}^{k-1} \sin \varphi_i \cos \varphi_k \text{ for } k \in [2, \ldots, n-1] \quad [2]$$

$$x_n = r \cdot \Pi_{i=1}^{n-2} \sin \varphi_i \cos \varphi_{n-1} \quad [3]$$

Also, the system 100 is configured to convert cartesian coordinate data into spherical coordinate data in accordance with at least equation 4, equation 5, equation 6, and equation 7. If the system 100 determines that $\varphi_k = y$, then the system 100 determines that this transformation is not unique and y can be chosen arbitrary. In this case, for example, the system 100 sets y to be equal to zero (i.e., y=0).

$$r = \sqrt{\sum_{i=1}^{n} x_i^2} \quad [4]$$

$$\varphi_k = \arccos \frac{x_k}{\sqrt{\sum_{i=1}^{n} x_i^2}} \text{ for } k \in [1, \ldots, n-2] \quad [5]$$

$$\varphi_{n-1} = 2 \cdot \text{arccot} \frac{x_{n-1} + \sqrt{x_{n-1}^2 + x_n^2}}{x_n} \quad [6]$$

For special cases, if $x_{k+1}, \ldots, x_n = 0$, then $\varphi_k$ can be determined via equation 7.

$$\varphi_k = \begin{cases} 0 & \text{if } x_k > 0 \\ \pi & \text{if } x_k < 0 \\ y & \text{if } x_k = 0 \end{cases} \text{ for any } k \in [1, \ldots, n-1] \quad [7]$$

FIG. 2 is a diagram illustrating a spherical autoencoding network 200 according to an example embodiment. As shown in FIG. 2, the spherical autoencoding network 200 includes a convolutional encoder 210 (with an encoding function of $f_{enc}$), a convolutional decoder 214 (with a decoding function of $f_{dec}$), a convolutional layer 224 (with a sigmoid activation function $f_{out}$), and an object segmenter 226. The processing system 110 is configured to receive an input image (e.g., source image 202) directly or indirectly from a sensor. More specifically, given a source image 202 (i.e., image $r \in \mathbb{R}^{h \times w \times c}$ of height h, width w, and channels c), the processing system 110 associates each pixel with fixed phase values 204 to create spherical input 206 for the spherical autoencoding network 200. For example, the fixed phase values 204 may include $\varphi_1, \ldots, \varphi_{n-1} = 0$. The spherical autoencoding network 200 receives input data, which comprises the spherical input 206 of $x = \{r, \varphi_1, \ldots, \varphi_{n-1}\} \in \mathbb{R}^{n \times h \times w \times c}$. The processing system 110 applies this spherical input 206 to the convolutional autoencoder 208 to generate spherical reconstruction data 218 ($\hat{z}$), as indicated in equation 8.

$$\hat{z} = f_{dec}(f_{enc}(x)) \in \mathbb{R}^{n \times h \times w \times c} \quad [8]$$

To train the spherical autoencoding network 200, the processing system 110 extracts the radial coordinates 220 ($r_{\hat{z}}$) of the spherical reconstruction data 218 ($\hat{z}$). The radial coordinates may also be referred to as the radial component. The processing system 110 applies a 1×1 convolutional layer 224 with sigmoid activation function $f_{out}$ to the extracted radial coordinates 220 ($r_{\hat{z}}$) to generate a result $\hat{r}$ via equation 9. In this case, result $\hat{r}$ refers to a reconstructed image 228. The reconstructed image 228 is a reconstructed version of the source image 202. The processing system 110 compares the result $\hat{r}$ (e.g., the reconstructed image 228) with the input image r (e.g., the source image 202) using a mean-squared error (MSE) function to calculate the loss $\mathcal{L}$ via equation 10. The processing system 110 generates loss data based on this loss calculation and updates the parameters of at least the autoencoding network 200 based on the loss data.

$$\hat{r} = f_{out}(r_{\hat{z}_i}) \in \mathbb{R}^{h \times w \times c} \quad [9]$$

$$\mathcal{L} = \text{MSE}(r, \hat{r}) \in \mathbb{R} \quad [9]$$

In addition, the processing system 110 uses the phase components 222

$$(\varphi_{\hat{z}_1}, \ldots, \varphi_{\hat{z}_{n-1}})$$

of the spherical reconstruction data 218 ($\hat{z}$) to create, via the object segmenter 226, pixel-accurate segmentation masks 230 for the objects of the input image r. The phase components 222 may also be referred to as angular components or angular coordinates. The phase components 222 provide object affiliation information. As an example, for instance, the object segmenter 226 is configured to identify a dominant phase for a particular phase component 222 ($\varphi_{\hat{z}_i}$) and identify a set of pixels possessing that dominant phase as belonging to a same object in the source image 202. The object segmenter 226 is configured to generate an object segmentation mask for a set of pixels, which are identified as belonging to an object, such that the object segmentation mask corresponds to that object of the source image 202.

Furthermore, regarding layer-wise operations, given the input $x \in \mathbb{R}^{n \times h \times w \times c}$ to the layer in Cartesian coordinates $x_1, \ldots, x_n$, the processing system 110 applies the weights (denoted as w) of a layer to each of the n dimensions separately to get the intermediate representation z (or the latent representation data 212) via equation 11. With this formulation, the spherical autoencoding network 200 may include and use any standard neural network layer in existing deep learning frameworks and that the dimensionality of the weights solely depends on the type of the layer is applied. For example, for a fully connected layer, the spherical autoencoding, network 200 is configured such that $w \in \mathbb{R}^{h \times w \times f}$ is satisfied, where f represents the feature dimension. Next, the processing system 110 transforms the latent representation data 212 (z) into spherical coordinates and applies a separate bias to each resulting dimension via equation 12 and equation 13.

$$z = \{f_w(x_i)\}_{i=1}^{n} \quad [11]$$

$$r' = r_z + b_r \quad [12]$$

$$\varphi'_i = \varphi'_{z_i} + b_i \text{ for } i \in [1, n-1] \quad [13]$$

The dimensionality of the bias depends on the type of the layer that is applied. For example, for a fully connected layer, all biases are $\in \mathbb{R}^{h \times w \times f}$. The processing system 110 also applies the weights on the radial coordinate of the input vector via equation 14 to generate resulting representation $\chi$. The processing system 110 combines the resulting representation $\chi$ with the radial coordinate r' of the previous calculation before applying a non-linearity to create the final radial output (i.e., r") of the layer via batch normalization (e.g., BatchNorm function) and a rectified linear unit (ReLU) as the activation function as indicated in equation 15. Based on the above, the processing system 110 generates the final output of the layer in spherical coordinates. In this regard, the spherical reconstruction data 218 or the final output comprises the following values: $\{r", \varphi'_1 \ldots, \varphi'_{n-1}\}$.

$$\chi = f_w(r_x) + b_r \quad [14]$$

$$r" = \text{ReLU}(\text{BatchNorm}(0.5 \cdot r' + 0.5 \cdot \chi)) \quad [15]$$

The spherical autoencoding network 200 can be readily applied to single-channel images (e.g., grayscale images). In this setting, the processing system 110 uses the radial component $r \in \mathbb{R}^{h \times w \times 1}$ of the output vector as the reconstructed image 228 and one or more phases $\varphi \in \mathbb{R}^{h \times w \times 1}$ to represent one or more object identities. However, following the same procedure on higher-dimensional inputs may lead to trivial results. As a non-limiting example, for instance, when an image includes a red object and blue object, then the spherical reconstruction process is biased towards assigning small radial components to the color channels that are inactive for the respective objects. Since the phase values for values with small radial components would be masked out, then this would lead to the objects being separated based on their reconstructed color values instead of their assigned phase values. Fortunately, the spherical autoencoder 130 resolves this problem by using a weighted average of the phase values across channels to create the final object-separating phase $\varphi'$ for each pixel. The spherical autoencoder 130 is configured to provide this as a technical solution since the machine learning model (e.g., convolutional autoencoder 208) assigns similar phases across the channels. In this case, the final object-separating phase $\varphi'$ for each pixel is expressed in equation 16, where $\epsilon = 1e-8$, $w_c = 10 \cdot r_c$ if $r_c < 0.1$, and $w_c = 1$ if $r_c \geq 0.1$.

$$\varphi' = \frac{\Sigma_c \, w_c \varphi_c}{\Sigma_c \, w_c + \epsilon} \quad [16]$$

Figure 3:
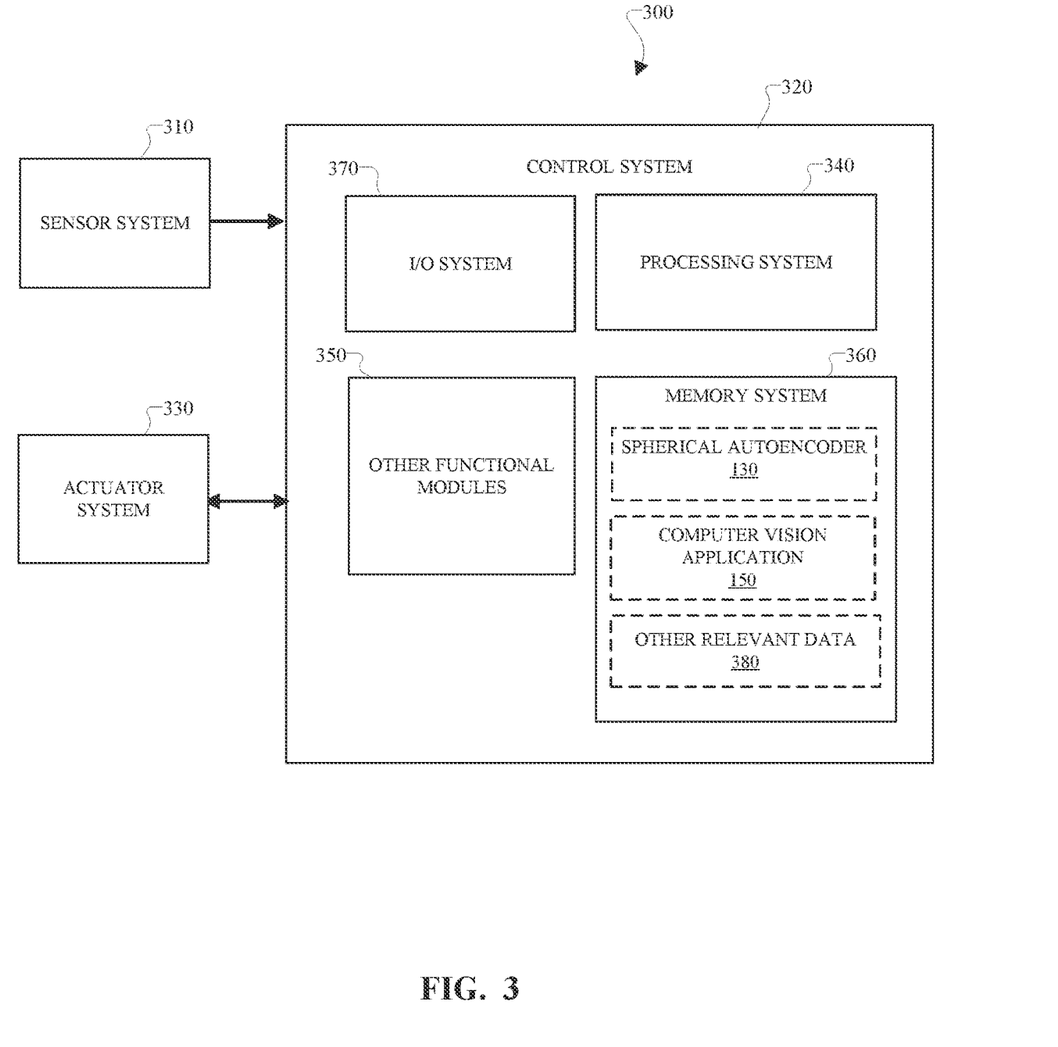
FIG. 3 is a diagram of an example of a system that includes the spherical autoencoder according to an example embodiment of this disclosure.
Figure 4:
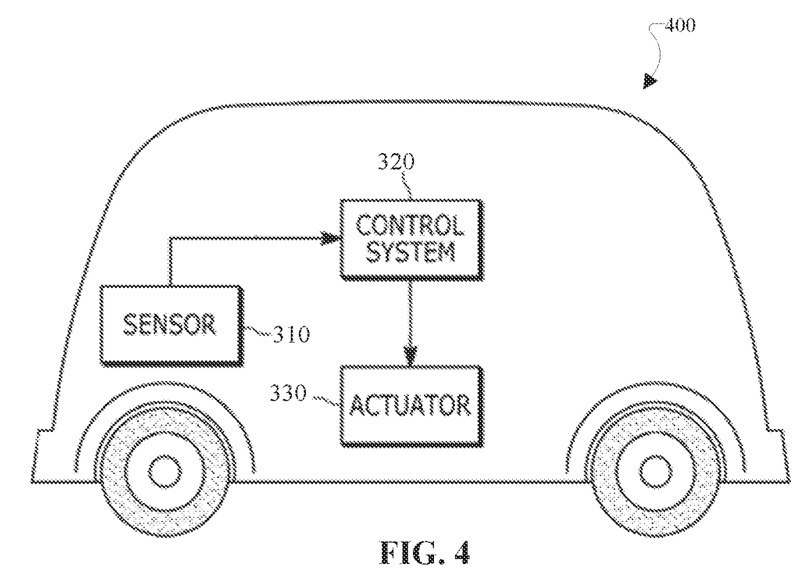
FIG. 4 is a diagram of the system of FIG. 3 with respect to mobile machine technology according to an example embodiment of this disclosure.
Figure 5:
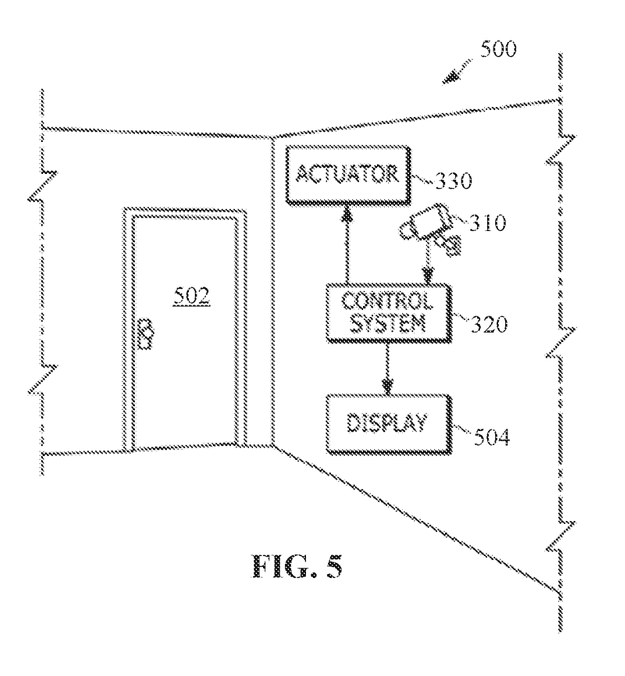
FIG. 5 is a diagram of the system of FIG. 3 with respect to security technology according to an example embodiment of this disclosure.
Figure 6:
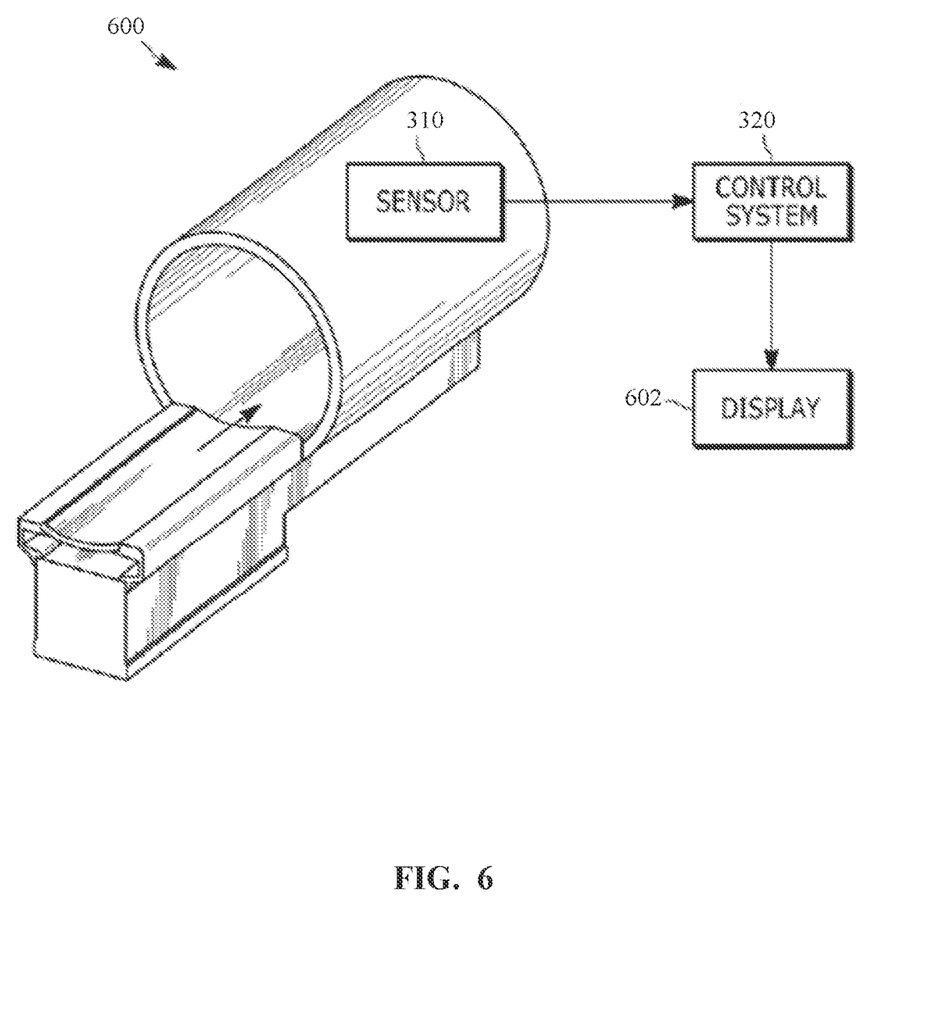
FIG. 6 is a diagram of the system of FIG. 3 with respect to imaging technology according to an example embodiment of this disclosure.

As described above, upon being trained, the spherical autoencoder 130 is configured to generate reconstructed image data and object identity data, which may be used in various downstream tasks, such as computer vision applications and/or other suitable applications. For example, FIG. 3, FIG. 4, FIG. 5, and FIG. 6 illustrate non-limiting examples of various applications that implement the spherical autoencoder 130. More specifically, FIG. 3 provides a foundation for FIG. 4, FIG. 5, and FIG. 6. Although FIG. 4, FIG. 5, and FIG. 6 illustrate non-limiting examples of various applications involving one or more aspects of the system 300 of FIG. 3, the system 300 may also be used in other applications such as manufacturing machines, robots, personal assistant technology, etc.

FIG. 3 is a diagram of a system 300, which includes the trained spherical autoencoder 130. The system 300 is configured to also include at least a sensor system 310, a control system 320, and an actuator system 330. The system 300 is configured such that the control system 320 controls the actuator system 330 based on sensor data from the sensor system 310. More specifically, the sensor system 310 includes one or more sensors and/or corresponding devices to generate sensor data. For example, the sensor system 310 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 310 is operable to communicate with the control system 320 via an input/output (I/O) system 370 and/or other functional modules 350, which includes communication technology.

The control system 320 is configured to obtain the sensor data directly or indirectly from one or more sensors of the sensor system 310. In this regard, the sensor data may include sensor data from a single sensor or sensor-fusion data from a plurality of sensors. Upon receiving input, which includes at least sensor data, the control system 320 is operable to process the sensor data via the processing system 340. In this regard, the processing system 340 includes at least one processor. For example, the processing system 340 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 340 is configured to extract, generate, and/or obtain proper input data (e.g., digital image data) for the spherical autoencoder 130. In addition, the processing system 340 is operable to generate output data (e.g., spherical reconstruction data 218, a reconstructed image 228, object segmentation masks 230, or any number and combination thereof) via the spherical autoencoder 130 based on communications with the memory system 360. In addition, the processing system 340 is operable to provide actuator control data to the actuator system 330 based on the output data from the spherical autoencoder 130 and/or the computer vision application 150.

The memory system 360 is a computer or electronic storage system, which is configured to store and provide access to various data to enable at least the operations and functionality, as disclosed herein. The memory system 360 comprises a single device or a plurality of devices. The memory system 360 includes electrical, electronic, magnetic, optical, semiconductor, electromagnetic, any suitable memory technology, or any combination thereof. For instance, the memory system 360 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 320 and/or processing system 340, the memory system 360 is local, remote, or a combination thereof (e.g., partly local and partly remote). For example, the memory system 360 may include at least a cloud-based storage system (e.g. cloud-based database system), which is remote from the processing system 340 and/or other components of the control system 320.

The memory system 360 includes at least the spherical autoencoder 130, which is executed via the processing system 340. The spherical autoencoder 130 is configured to receive or obtain a digital image (e.g., source image 202). In this regard, the spherical autoencoder 130, via the processing system 340, is configured to generate output data (e.g., spherical reconstruction data 218, a reconstructed image 228, object segmentation masks 230, or any number and combination thereof) based on the source image 202.

In addition, the memory system 360 includes the computer vision application 150. The computer vision application 150 is configured to apply the output (e.g., object segmentation masks 230 and/or reconstructed image 228) of the spherical autoencoder 130 to computer vision technology. The computer vision application 150 may perform object classification, object recognition, object tracking, or the like based on the object segmentation masks 230. Also, the memory system 360 is also configured to store other relevant data 380, which relates to the operation of the system 300 in relation to one or more components (e.g., sensor system 310, the actuator system 330, etc.).

Furthermore, as shown in FIG. 3, the system 300 includes other components that contribute to operation of the control system 320 in relation to the sensor system 310 and the actuator system 330. For example, as shown in FIG. 3, the control system 320 includes the I/O system 370, which includes one or more interfaces for one or more I/O devices that relate to the system 300. For example, the I/O system 370 provides at least one interface to the sensor system 310 and at least one interface to the actuator system 330. Also, the control system 320 is configured to provide other functional modules 350, such as any appropriate hardware technology, software technology, or any combination thereof that assist with and/or contribute to the functioning of the system 300. For example, the other functional modules 350 include an operating system and communication technology that enables components of the system 300 to communicate with each other as described herein. With at least the configuration discussed in the example of FIG. 3, the system 300 is applicable in various technologies.

FIG. 4 is a diagram of the system 300 with respect to mobile machine technology 400 according to an example embodiment. As a non-limiting example, the mobile machine technology 400 includes at least a partially autonomous vehicle or robot. In FIG. 4, the mobile machine technology 400 is at least a partially autonomous vehicle, which includes a sensor system 310. The sensor system 310 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 310 is configured to provide sensor data to the control system 320.

The control system 320 is configured to obtain image data, which is based on sensor data or sensor-fusion data from the sensor system 310. In addition, the control system 320 is configured to pre-process the sensor data to provide input data of a suitable form (e.g., digital image data) to the spherical autoencoder 130. In this regard, the spherical autoencoder 130 is advantageously configured to generate object segmentation masks for object discovery.

In addition, the control system 320 is configured to generate actuator control data, which is based at least on output data of the spherical autoencoder 130 in accordance with the computer vision application 150. Since the spherical autoencoder 130 is enabled to provide pixel-accurate object segmentation masks to the computer vision application 150, the control system 320 is configured to generate actuator control data that allows for safer and more accurate control of the actuator system 330 of the vehicle by being able to identify and track Objects in image/video data with accuracy at the pixel level. The actuator system 330 may include a braking system, a propulsion system, an engine, a drivetrain, a steering system, or any number and combination of actuators of the vehicle. The actuator system 330 is configured to control the vehicle so that the vehicle follows rules of the roads and avoids collisions based at least on the object detection, object recognition, and/or object tracking as determined by the spherical autoencoder 130 and the computer vision application 150.

FIG. 5 is a diagram of the system 300 with respect to security technology 500 according to an example embodiment. As a non-limiting example, the security technology 500 includes at least a monitoring system, a control access system, a surveillance system, or any suitable type of security apparatus. For instance, as one example. FIG. 5 relates to security technology 500, which is configured to physically control a locked state and an unlocked state of a lock of the door 502 and display an enhanced image/video on the display 504. The sensor system 310 includes at least an image sensor that is configured to provide image/video data.

The control system 320 is configured to obtain the image/video data from the sensor system 310. The control system 320 is also configured generate pixel-accurate object segmentation masks for object discovery via the spherical autoencoder 130 based on the image/video data obtained from the sensor system 310. In this regard, the spherical autoencoder 130 is configured to detect and identify one or more objects in the image/video data. In addition, the control system 320 is configured to generate actuator control data that allows for safer and more accurate control of the actuator system 330 by detecting and identifying objects in the image/video data based on object segmentation masks with pixel-wise accuracy. The control system 320 is configured to display any data relating to the objects identified in the image/video data via the display 504.

FIG. 6 is a diagram of the system 300 with respect to imaging technology 600 according to an example embodiment. As a non-limiting example, the imaging technology 600 includes a magnetic resonance imaging (MRI) apparatus, an x-ray imaging apparatus, an ultrasonic apparatus, a medical imaging apparatus, or any suitable type of imaging apparatus. In FIG. 6, the sensor system 310 includes at least one imaging sensor. The control system 320 is configured to obtain image data from the sensor system 310. The control system 320 is also configured to discover objects in the image/video data via the object segmentation masks provided by the spherical autoencoder 130. In addition, the control system 320 is configured to provide more accurate medical information since the objects discovered by the spherical autoencoder 130 provides pixel-wise accuracy. In addition, the control system 320 is configured to display the any relevant data relating to the discovered objects in the image/video data on the display 602.

As described in this disclosure, the spherical autoencoder 130 provides several advantages and benefits. For example, the spherical autoencoder 130 is configured to learn object representations via an unsupervised training procedure. Also, the spherical autoencoder 130 can be applied to a single-channel image (e.g., grayscale image) or a multi-channel image (e.g. RGB color image or the like). The spherical autoencoder 130 can be applied to higher-dimensional inputs. As an advantage, the spherical autoencoder 130 leverages and represents activations using spherical coordinates. In this regard, the spherical autoencoder 130 is configured to use multi-dimensional angles to represent objects. Also, the spherical autoencoder 130 is configured to generate object segmentation masks, which are advantageous in locating objects and boundaries (lines, curves, etc.) of objects in images with accuracy at the pixel level.

Furthermore, the spherical autoencoder 130 is advantageous over slot-based approaches by providing a spherical autoencoding network 200 with an architecture, which is less complex and less involved than the slot-based architectures. In addition, the spherical autoencoder 130 overcomes the limitations of the complex autoencoder by having the capacity to represent a greater number of objects than the complex autoencoder. The spherical autoencoder 130 provides a spherical autoencoding network 200 associated with distributed object-centric representations. Overall, the spherical autoencoder 130 provides a spherical autoencoding network 200 and corresponding process that perform reconstruction and object discovery in an efficient and effective manner.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for object discovery, the computer-implemented method comprising:
   receiving a source image obtained from at least one sensor;
   generating input data for an encoder by associating each pixel of the source image with predetermined phase values;
   encoding, via the encoder, the input data to generate latent representation data in spherical coordinates;
   decoding, via a decoder, the latent representation data to generate spherical reconstruction data of the source image, the spherical reconstruction data including a radial component and a plurality of phase components; and
   generating a reconstructed image based at least on the radial component, the reconstructed image being a reconstruction of the source image.

2. The computer-implemented method of claim 1, further comprising:
   generating a plurality of object masks based on the plurality of phase components, the plurality of object masks include a first object mask based on a first phase component and a second object mask based on a second phase component,
   wherein the first object mask corresponds to a first object displayed in the source image and the second object mask corresponds to a second object displayed in the source image.

3. The computer-implemented method of claim 1, wherein:
   the radial component corresponds to feature information of the source image, and
   the plurality of phase components correspond to object affiliation information of the source image, the object affiliation information associating a set of pixels with a corresponding object that is displayed in the source image.

4. The computer-implemented method of claim 1, wherein the reconstructed image is generated by applying a convolutional layer with a sigmoid activation function to the radial component.

5. The computer-implemented method of claim 1, further comprising:
   generating loss data based on a comparison between the source image and the reconstructed image; and
   updating parameter data of an autoencoder based on the loss data,
   wherein the autoencoder includes the encoder and the decoder.

6. The computer-implemented method of claim 5, wherein the loss data is generated based on a mean-squared error between the source image and the reconstructed image.

7. The computer-implemented method of claim 1, further comprising:
   generating object-separating phase data for each pixel of the source image by using a weighted average of the plurality of phase components across channels associated with the source image,
   wherein the channels include a red channel, a green channel, and a blue channel.

8. A system comprising:
   a processor; and
   a memory in data communication with the processor, the memory having computer readable data including instructions stored thereon that, when executed by the processor, cause the processor to perform a method that includes:
   receiving a source image Obtained from at least one sensor;
   generating input data for an encoder by associating each pixel of the source image with predetermined phase values;
   encoding, via the encoder, the input data to generate latent representation data in spherical coordinates;
   decoding, via a decoder; the latent representation data to generate spherical reconstruction data of the source image, the spherical reconstruction data including a radial component and a plurality of phase components; and
   generating a reconstructed image based at least on the radial component, the reconstructed image being a reconstruction of the source image.

9. The system of claim 8, further comprising:
   generating a plurality of object masks based on the plurality of phase components, the plurality of object masks include a first object mask based on a first phase component and a second object mask based on a second phase component, wherein the first object mask corresponds to a first object displayed in the source image and the second object mask corresponds to a second object displayed in the source image.

10. The system of claim 8, wherein:
the radial component corresponds to feature information of the source image, and
the plurality of phase components correspond to object affiliation information of the source image, the object affiliation information associating a set of pixels with a corresponding object that is displayed in the source image.

11. The system of claim 8, wherein the reconstructed image is generated by applying a convolutional layer with a sigmoid activation function to the radial component.

12. The system of claim 8, further comprising:
generating loss data based on a comparison between the source image and the reconstructed image; and
updating parameter data of an autoencoder based on the loss data,
wherein the autoencoder includes the encoder and the decoder.

13. The system of claim 12, wherein the loss data is generated based on a mean-squared error between the source image and the reconstructed image.

14. The system of claim 8, further comprising:
generating object-separating; phase data for each pixel of the source image by using a weighted average of the plurality of phase components across channels associated with the source image,
wherein the channels include a red channel, a green channel, and a blue channel.

15. A non-transitory computer readable medium having computer readable data including instructions stored thereon that, when executed by a processor, cause the processor to perform a method, the method including:
receiving a source image obtained from at least one sensor;
generating input data for an encoder by associating each pixel of the source image with predetermined phase values;
encoding, via the encoder, the input data to generate latent representation data in spherical coordinates;
decoding, via a decoder, the latent representation data to generate spherical reconstruction data of the source image, the spherical reconstruction data including a radial component and a plurality of phase components; and
generating a reconstructed image based at least on the radial component, the reconstructed image being a reconstruction of the source image.

16. The non-transitory computer readable medium of claim 15, further comprising:
generating a plurality of object masks based on the plurality of phase components, the plurality of object masks include a first object mask based on a first phase component and a second object mask based on a second phase component,
wherein the first object mask corresponds to a first object displayed in the source image and the second object mask corresponds to a second object displayed in the source image.

17. The non-transitory computer readable medium of claim 15, wherein:
the radial component corresponds to feature information of the source image, and
the plurality of phase components correspond to object affiliation information of the source image, the object affiliation information associating a set of pixels with a corresponding object that is displayed in the source image.

18. The non-transitory computer readable medium of claim 15, wherein the reconstructed image is generated by applying a convolutional layer with a sigmoid activation (Unction to the radial component.

19. The non-transitory computer readable medium of claim 15, further comprising:
generating loss data based on a comparison between the source image and the reconstructed image; and
updating parameter data of an autoencoder based on the loss data,
wherein the autoencoder includes the encoder and the decoder.

20. The non-transitory computer readable medium of claim 15, further comprising:
generating object-separating phase data for each pixel of the source image by using a weighted average of the plurality of phase components across channels associated with the source image,
wherein the channels include a red channel, a green channel, and a blue channel.

* * * * *

UNITED STATES PATENT AND TRADEMARK OFFICE
CERTIFICATE OF CORRECTION

PATENT NO. : 12,354,230 B2  
APPLICATION NO. : 17/957156  
DATED : July 8, 2025  
INVENTOR(S) : Lowe et al.

Page 1 of 1

It is certified that error appears in the above-identified patent and that said Letters Patent is hereby corrected as shown below:

In the Claims

In Claim 14, at Column 13, Line 28: "object-separating; phase data" should read --object-separating phase data--.

In Claim 18, at Column 14, Line 29: "(Unction" should read --function--.

Signed and Sealed this  
Eighteenth Day of November, 2025

John A. Squires  
*Director of the United States Patent and Trademark Office*